United States Patent
Abeling et al.

(10) Patent No.: US 8,234,448 B2
(45) Date of Patent: Jul. 31, 2012

(54) REDUNDANCY PROTECTED MASS STORAGE SYSTEM WITH INCREASED PERFORMANCE

(75) Inventors: Stefan Abeling, Schwarmstedt (DE); Wolfgang Klausberger, Hannover (DE); Thomas Brune, Hannover (DE); Axel Kochale, Springe (DE)

(73) Assignee: Thomson Licensing, Issy les Moulineaux (FR)

( * ) Notice: Subject to any disclaimer, the term of this patent is extended or adjusted under 35 U.S.C. 154(b) by 272 days.

(21) Appl. No.: 12/733,292

(22) PCT Filed: Aug. 5, 2008

(86) PCT No.: PCT/EP2008/060257
§ 371 (c)(1),
(2), (4) Date: Feb. 22, 2010

(87) PCT Pub. No.: WO2009/024456
PCT Pub. Date: Feb. 26, 2009

(65) Prior Publication Data
US 2011/0055472 A1    Mar. 3, 2011

(30) Foreign Application Priority Data
Aug. 23, 2007   (EP) .................................. 07114829

(51) Int. Cl.
*G06F 12/16* (2006.01)
(52) U.S. Cl. ......... 711/114; 711/150; 711/156; 711/162
(58) Field of Classification Search .................. 711/114, 711/156, 161, 162; 707/674
See application file for complete search history.

(56) References Cited

U.S. PATENT DOCUMENTS

| | | | |
|---|---|---|---|
| 6,018,778 A * | 1/2000 | Stolowitz | 710/61 |
| 6,308,007 B1 | 10/2001 | Iwasaki | |
| 6,430,118 B1 | 8/2002 | Anderson | |
| 6,799,283 B1 | 9/2004 | Tamai et al. | |
| 2008/0155216 A1* | 6/2008 | Shoham | 711/162 |
| 2009/0049262 A1* | 2/2009 | Kaiya et al. | 711/162 |

FOREIGN PATENT DOCUMENTS

| | | |
|---|---|---|
| EP | 0926891 A1 | 6/1999 |
| EP | 1589426 A2 | 10/2005 |
| GB | 2432440 A | 5/2007 |
| WO | WO 2004/092942 A2 | 10/2004 |

OTHER PUBLICATIONS

Azer Bestavros, "IDA-based Redundant Arrays of Inexpensive Disks", The IEEE International Conference on Parallel and Distributed Information Systems, Dec. 1991, XP002471360, Miami Beach, FL, USA.

Yitzhak Birk, "Random PAIDs with selective exploitation of redundancy for high performance video servers" Network and Operating System Support for Digital Audio and Video, May 19, 1997, XP010251681, Proceedings of the IEEE $7^{TH}$ International Workshop on St.Louis, MO, USA.

* cited by examiner

Primary Examiner — John Lane
(74) Attorney, Agent, or Firm — Tutunjian & Bitetto, P.C.

(57) ABSTRACT

The present invention relates to a redundancy protected mass storage system with increased performance, and more specifically to a mass storage system with multiple storage units. According to the invention, the resources that are essentially provided for compensating the damage of one or more storage units are also used to enhance the system performance. For this purpose during reading or writing the storage system just waits for the responses of a minimum number of required storage units to start reading or writing, respectively.

6 Claims, 4 Drawing Sheets

REDUNDANCY PROTECTED MASS STORAGE SYSTEM WITH INCREASED PERFORMANCE

Figure 1:
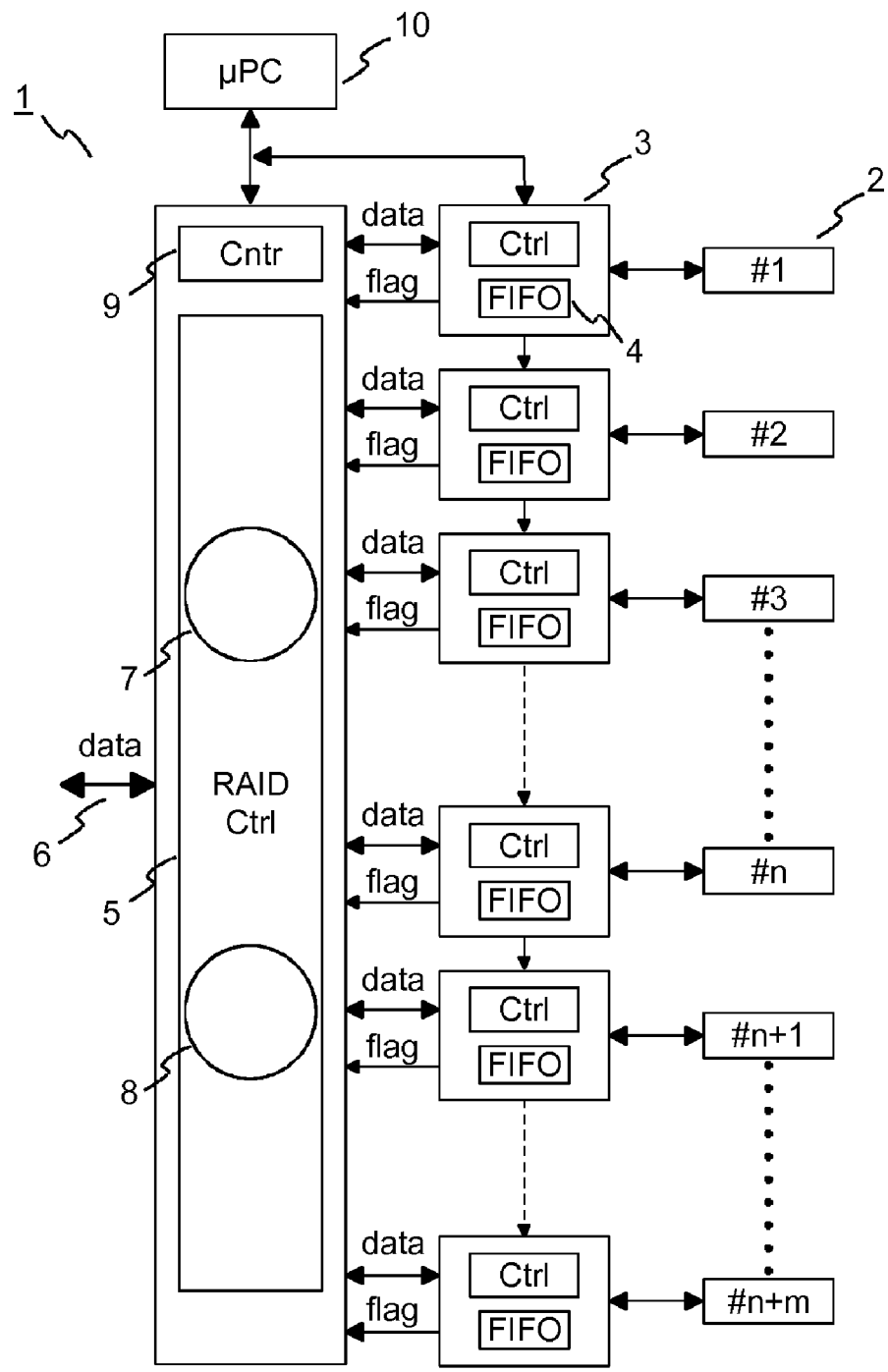

This application claims the benefit, under 35 U.S.C. §365 of International Application PCT/EP2008/060257, filed Aug. 5, 2008, which was published in accordance with PCT Article 21(2) on Feb. 26, 2009 in English and which claims the benefit of European patent application No. 07114829.0, filed Aug. 23, 2007.

The present invention relates to a redundancy protected mass storage system with increased performance, and more specifically to a mass storage system with multiple storage units.

In order to increase the data rate of a mass storage system, typically a parallelization of the data input to multiple storage units is employed. The use of multiple storage units, however, leads to a storage system with a higher probability of disturbance of a single storage unit. This may cause data losses. To prevent this problem a RAID architecture is commonly used to protect data within such a mass storage system.

Several solutions exist for the data parallelization to the storage units in a RAID architecture. In case a high data rate is needed, like for example in real-time video data storage, while concurrently a small and compact form factor is demanded, the mass storage system will generally be built in such way that it operates on the performance boundary. The consequence is that all single storage units are accessed in parallel to meet the performance requirements. In such a case, the storage unit with the slowest access time and the longest data transfer time determines the data access time of the mass storage system.

Depending on the kind of data protection that is used against data losses in a RAID architecture, the amount of extra storage capacity and performance required to implement the protection may be relatively high. These extra resources are commonly used to ensure the data availability in case of damage or disturbance of one or more of the individual storage units. Due to problems with a single storage unit, caused for example by mechanical effects such as head vibrations or damaged sectors of a harddisk, the performance of the whole mass storage system can be dramatically slowed down. This reduced performance may be such low that suddenly and for a certain period of time the real-time performance requirements are not met.

To overcome the above problem, US 2006/0123312 discloses a RAID system with improved performance. Only the required minimum subset of the available harddisks is accessed for solving a parity stripe equation for a particular parity stripe. In other words, the minimum required subset of harddisks is used to perform an 'exposed read' or a 'rebuild' with overlapping harddisk accesses. The solution allows to distribute the use of individual harddisks evenly, and to increase the performance for a 'rebuild'. The subset of harddisks is chosen by an algorithm or simply by chance. Though this solution allows to increase the performance, and to prevent excessive performance drops, it is not applicable to a storage system working at the performance boundary, i.e. a storage system using only the minimum number of storage units necessary to achieve a required data rate.

It is an object of the invention to propose an alternative solution for a redundancy protected mass storage system, which has an increased performance and uses only a minimum number of storage units required to achieve a given data rate.

According to the invention, this object is achieved by a method for reading data from a redundancy protected storage system with two or more storage units, having the steps of:
  issuing a read request to the two or more storage units,
  determining the number of storage units having data available for reading,
  reading the available data when at least a minimum number of storage units has data available for reading,
  reconstructing missing data from the read data
  defining one or more synchronization points,
  discarding data up to a next synchronization point for those storage units that do not have data available for reading, and
  making available data starting from the next synchronization point in those storage units for which data have been discarded.

Advantageously, upon reading of the available data those storage units, that do not yet have data available for reading, are reset. In this way those storage units are already available for the next read request.

Similarly, a method for writing data to a redundancy protected storage system with two or more storage units has the steps of:
  issuing a write request to the two or more storage units,
  writing the data to the storage units,
  determining a number of storage units that indicate a buffer overrun,
  marking the data as intact when the number of storage units that indicate a buffer overrun does not exceed a maximum number, and
  marking the data as corrupted when the number of storage units that indicate a buffer overrun does exceed the maximum number.

The writing method according to the invention enhances the writing performance of a write access by tolerating a certain number of buffer overruns. A buffer overrun occurs if an input buffer, e.g. a FIFO buffer, is no longer capable of buffering the incoming data. This is the case, for example, when the input buffer is full because data are not transferred fast enough from the buffer to the storage unit. However, when executing a read access to the data of the write access, the storage units which had a buffer overrun can not be taken into consideration and the read performance advantage is lost. In addition, the redundancy protection against data loss is not available for these data. In order to rebuild this protection the method for writing data to the storage system further has the steps of:
  memorizing those storage units that have indicated a buffer overrun,
  after finishing the writing of the data, rebuilding the data for the memorized storage units, and
  writing the rebuilt data to the memorized storage units.

For rebuilding the data in a first step the memorized information about which storage units have indicated a buffer overrun is retrieved from the storage system. Then the data of the specific write access are read from those storage units that did not have a buffer overrun. These data are then used for rebuilding the missing data.

In summary, the invention allows to the enhance the system performance by making use of those resources that are essentially provided for compensating the damage of one or more storage units. For this purpose during reading the storage system just waits for the responses of a minimum number of required storage units to start reading. During writing data are treated as intact when at most a maximum number of storage units have indicated a buffer overrun, i.e. when data have been correctly written to at least the minimum number of storage units. The minimum number of storage units is equal to the number of storage units contained in the storage system minus the number of storage units whose absence or damage can be tolerated, i.e. compensated for by using redundancy data. In this way the impact of a single storage unit to the storage system performance is minimized.

Preferably, flags are associated to the storage units, which indicate whether a storage unit has data available for reading, or whether during writing a buffer overrun occurred. The reading flag favorably indicates the amount of data that is available or has been transferred, or simply whether the amount of data exceeds a specified value. The writing flag preferably simply indicates whether a buffer overrun has occurred or not. Such flags can easily be evaluated by a controller to determine whether the necessary minimum number of storage units is already reached.

Advantageously, the storage system is a RAID system. A RAID architecture is a well known architecture for implementing a redundancy protected storage system, so that a wide range of controllers and other system elements are readily available.

Though the present invention is applicable for storage systems with arbitrary types of storage units, e.g. drives for optical or magnetic disks and solid state memories, it is especially useful for a harddisk array with minimized size. In order to minimize the size of the storage system, e.g. in order to achieve mobility of the storage system, only the absolute minimum number of harddisks is employed. This minimum number is chosen such that in accordance with the guaranteed data rate of the harddisks the system is still capable of delivering the necessary data throughput for ensuring a required data rate. The sustained data rate of the harddisks is advantageously determined experimentally. As the data to be recorded are usually sensitive data, the harddisk array is RAID-6 protected, e.g. by implementing an EVENODD algorithm for generating redundancy. This means that two arbitrary harddisks may fail without loss of data.

Assigned to the storage unit controllers, e.g. ATA controllers, are FIFOs, which contain the data read from the harddisks. In the beginning the harddisks synchronously receive a read command. The RAID controller continuously evaluates the flags issued by the FIFOs. The flags indicate the amount of data available in the respective FIFO. When the minimum number 'n' of flags (or more), i.e. the minimum amount of data, is available, the data contained in the FIFOs are transferred to the RAID controller. When the data has been retrieved from the FIFOs, the flags are evaluated again and the whole process starts again. The minimum number 'n' is preferably chosen such that in sum sufficient data are available to ensure that the RAID controller algorithm is executed reliably. This means that the FIFOs need to contain enough data to enable a reconstruction of the missing data.

As soon as the first word is read from the FIFOs, for those FIFOs whose flag does not indicate a sufficient amount of data, i.e. for those FIFOs that do not belong to the chosen harddisk subset, the data up to the next synchronization point are discarded and the data starting from this synchronization point are written into those FIFOs that do not belong to the chosen subset. In any case, at this instance a synchronization point needs to be determined. The data of the next read access may already be written into the FIFO, they may however only be indicated by the flag when the remaining FIFOs have arrived at the same data word, i.e. in this case at the first data word of the second read access. This is advantageously implemented by a counter, which counts the read commands from the RAID controller to the individual FIFOs. In this way initially slower harddisks may be part of the subset of faster harddisks used during the next read access. Likewise, those FIFOs whose flag does not indicate a sufficient amount of data may be reset and the read access to the corresponding harddisk is terminated. Subsequently the harddisk may receive the next read command.

The decision whether to reset the FIFOs that do not belong to the chosen subset, or to simply discard the data up to the next synchronization point, is preferably chosen in dependence of the size of the read access to a storage unit. In case of an array of harddisks, for example, a certain harddisk may be slower because of disturbances. However, it may likewise be slower because it needs a longer time to find the data to be read. Once it has found the data, the data are written fast to the corresponding FIFO. In this case the high transfer rate of the harddisk is only slowed down when the FIFO becomes full. In this way also without a reset a slower harddisk may become a faster harddisk during one of the subsequent synchronization points.

The present invention allows to obtain the highest performance of a harddisk array, especially during reading. For this purpose the fastest harddisks are repeatedly determined at specified instances, which can be chosen at will.

Figure 2:
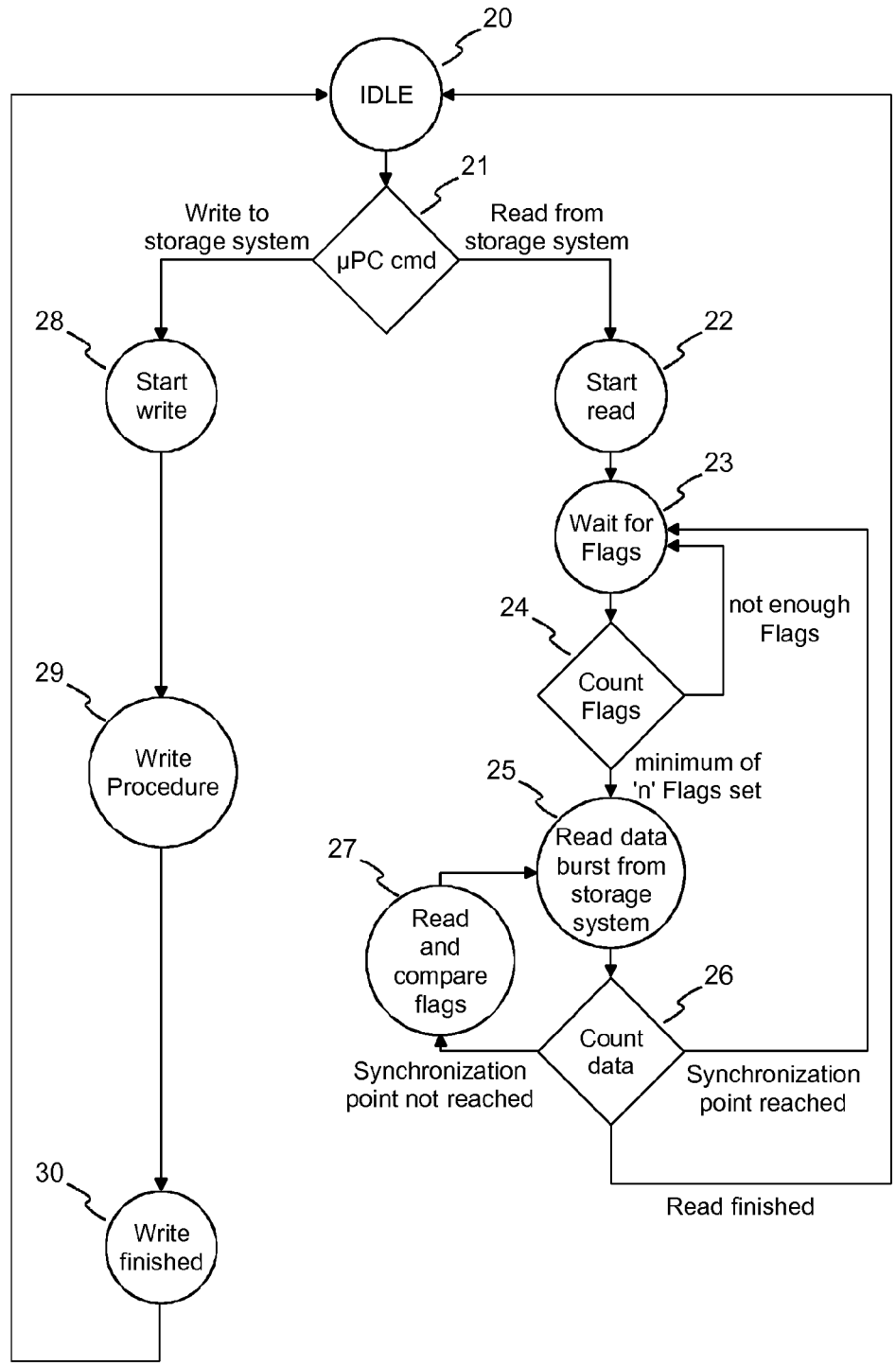
Figure 3:
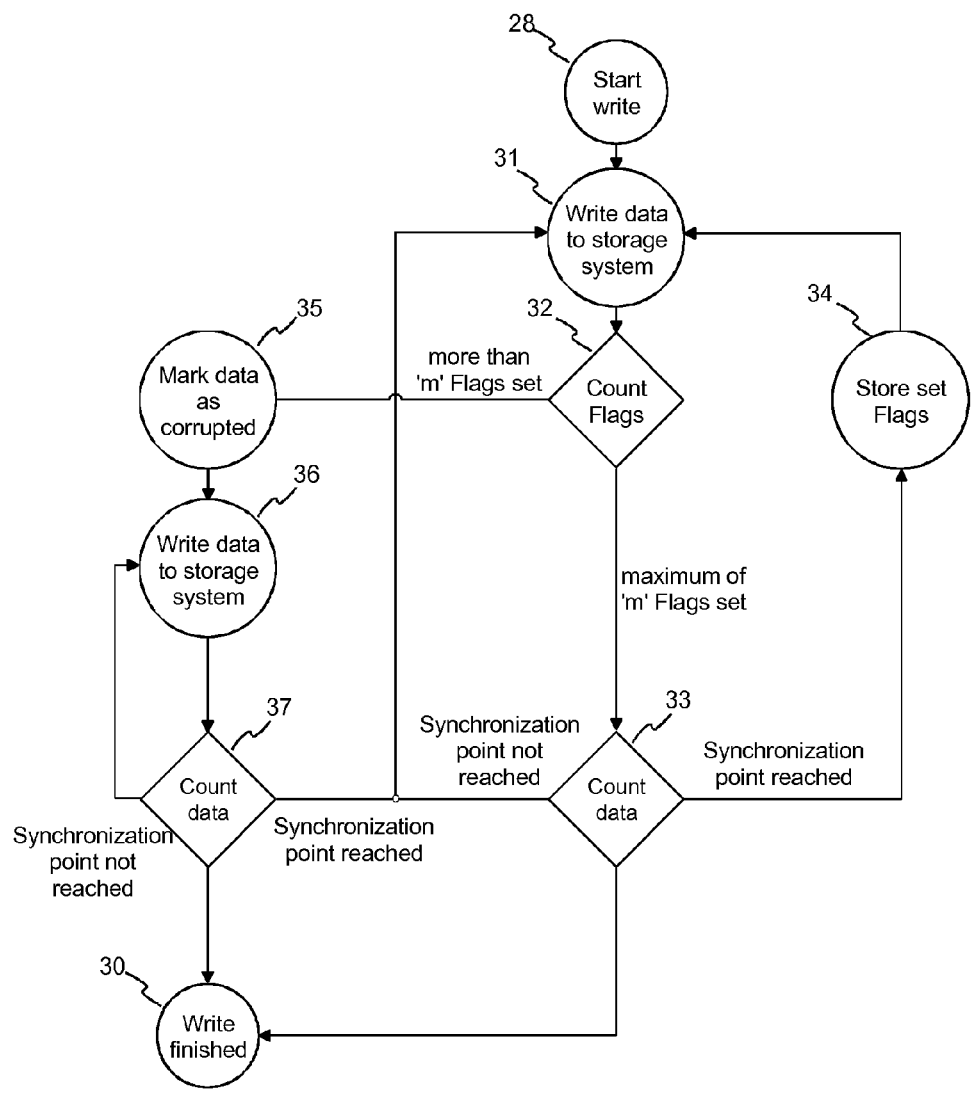
Figure 4:
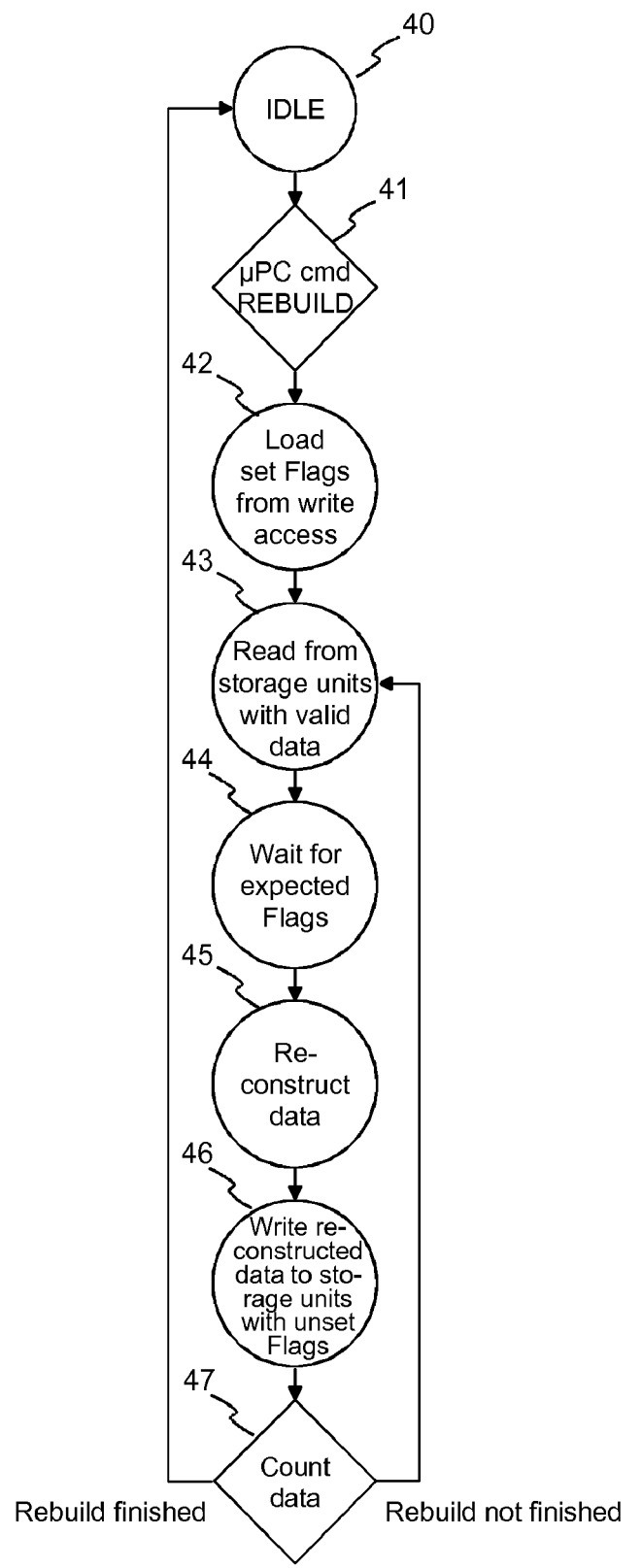

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 shows an exemplary mass storage system according to the invention using a RAID architecture, FIG. 2 schematically depicts a process diagram of read and write accesses to the mass storage system of FIG. 1, FIG. 3 depicts the write access in more detail, and FIG. 4 depicts a process diagram of a rebuild access.

In the following the invention is explained with reference to a mass storage system with a RAID architecture. Of course, the invention is not limited to such an application.

FIG. 1 schematically shows a mass storage system 1 using a RAID architecture. Mass storage systems 1 are commonly based on multiple individual storage units 2. In a RAID architecture with a protection against data losses when storage units are damaged, a certain number 'n' of storage units is necessary to provide correct data. Further 'm' storage units 2 are present, which can be damaged without causing a data loss. Consequently, the mass storage system 1 contains 'n+m' storage units 2, where 'm' arbitrary storage units can fail without causing a data loss. Typically, such a kind of data protection is achieved by adding a certain amount of redundancy to the data. With an efficient algorithm, the capacity of the 'm' storage units is used for redundancy.

To achieve a high parallelization each storage unit 2 has its own storage unit controller 3 with a FIFO buffer 4. A RAID controller 5 splits a single incoming data stream 6 to send it to multiple storage units 2 in parallel. Furthermore, an algorithm 7 implemented in the RAID controller 5 adds a certain amount of redundancy to the data, which is also sent to the storage units 2. In the opposite direction, a further algorithm 8 implemented in the RAID controller 5 merges the data coming from the storage units 2 into a single outgoing data stream 6. If necessary, the algorithm 8 of the RAID controller 5 reconstructs some data which are lost due to disturbances of one or more of the storage units 2. Generally, there is a microprocessor (µPC) 10 capable of configuring the control units 3 and of starting and terminating data transfers. A flag counter 9 counts flags issued by the FIFO buffers 4 of the storage unit controllers 3. During reading the FIFO flag represents the amount of data available in the FIFO buffer 4 of a storage unit 2. A threshold is defined beforehand, which determines the minimum amount of data that has to be present in a FIFO buffer 4 before a FIFO flag is set. The FIFO flag thus indicates that at least the minimum amount of data is available in the corresponding FIFO buffer 4. During writing the FIFO flag indicates the occurrence of a buffer overrun.

FIG. 2 schematically depicts a process diagram of read and write accesses to the mass storage system. The procedure described in the following is especially useful when all storage units are involved in every data transaction. It is then advantageous to split up the data stream into small pieces, called 'stripes' within the RAID language, which are transferred to and from each storage unit 2.

A differentiation has to be made between a read access and a write access to the mass storage system 1. First a read access shall be described.

When out of an idle state 20 a read access is initiated 21 by the µPC 10, the RAID controller 5 is set into a read mode and the storage unit controllers 3 receive the information necessary to perform a read access 22 to their respective storage units 2. The data retrieved from the storage units 2 is written into the respective FIFO buffers 4. The FIFOs 4 issue 23 flags indicating that data are available. The flag counter 9 counts 24 the single FIFO flags. The data burst transfer from the FIFOs 4 to the RAID controller 5 starts 25 when a minimum of 'n' FIFO flags are set. The threshold 'n' for the FIFO flags is determined beforehand such that there are sufficient data reliably available to fulfill the requirements of the reconstruction algorithm 8 implemented in the RAID controller 5. In this way, it is ensured that when a transfer is started the algorithm 8 is executed correctly, as the amount of data required by the algorithm 8 is available in the FIFO buffers 4 whose FIFO flag is set. The data of the storage units 2 that respond later than the first 'n' storage units 2 is reconstructed within the RAID controller 5. A necessary condition for this approach is that the reconstruction of the missing data can be done in time and does not slow down the transfer performance. The storage units 2, that are no longer involved in the actual transfer due to the reconstruction of the missing data, subsequently stop their activities for the current transfer and start with the next transfer, provided there is one in the queue. Alternatively, the data up to the next synchronization point are discarded and the data starting from this synchronization point are written into those FIFO buffers 4 that are no longer involved in the actual transfer. In both cases, for the next transfer the formerly slow storage units 2 constitute a performance advantage. When the data burst transfer from the FIFO buffers 4 is finished 26 and the FIFO buffers 4 could become empty, the FIFO flags are read and compared 27. The same FIFO flags as determined 24 before have to be set before the next data burst transfer 25 can be executed. This is necessary because only the same FIFO buffers 4 have synchronous data. When a data burst transfer is finished and concurrently, a synchronization point is determined 26, the FIFO flags are evaluated again and a new subset of a minimum of 'n' storage units 2 is determined. This procedure is repeated until all demanded data are read. An example of a useful determination 26 of a synchronization point is when the FIFO buffer 4 of a storage unit controller 3 could become empty, or when a new read command is sent from the storage unit controller 3 to a storage unit 2. The sending of a new read command can only be used when the FIFO flags are always evaluated in case the FIFOs 4 could become empty. If this is not also a synchronization point, the subset of FIFOs 4 chosen for reading remains the same. In other words, a synchronization point is the point at which the FIFOs 4 synchronize, and at which a new subset is chosen. The evaluation of the FIFO flags does not necessarily yield a new subset.

By way of example, a FIFO flag is set when at least eight words are available in a FIFO buffer 4. The algorithm 8 requires n×8 words to calculate correct data. When n FIFO flags are set, in each case eight words are read from the FIFO buffers 4 in a burst. It may then occur that the FIFO buffers 4 subsequently contain less then eight words. Therefore, the number of set FIFO flags has to be evaluated again before the next eight words can be reliably read. This is a point where the FIFO flags need to be evaluated again. This point can also be defined as a synchronization point. If, however, the slower storage units 2 have already received a new read request, the first possible synchronization point is reached when all data of the previous read request have been transferred. In any case the number of set FIFO flags has to be evaluated after having read eight words from each FIFO 4 whose FIFO flag was set, i.e. after having read eight words from n or more FIFOs 4. Only at a synchronization point a new subset of a minimum of 'n' FIFO buffers 4 from which data is to be read can be determined. If the point of evaluation of FIFO flags is not a synchronization point, it has to be ensured that the subset of FIFO buffers 4 from which data are read remains the same.

The advantage of the above approach is that slow storage units 2 are not used for a read access. When a large amount of data has to be transferred, it is usually divided into many little data chunks. For each data chunk, the proposed mechanism makes a new decision about which storage units are the fastest to provide the data as fast as possible, and which storage units respond slower and can already execute the next read access in order to have a performance advantage for the next data chunk For a write access the implementation of a mechanism according to the invention is more complex, as illustrated in FIG. 3. When out of an idle state 20 a write access is initiated 21 by the µPC 10, the RAID controller 5 is set into a write mode and the storage unit controllers 3 receive the information necessary to perform a write access 28 to their respective storage units 2. Also during a write access it is possible to write data just to the minimum number of 'n' storage units 2. The data to be stored in the storage system 1 are written 31 into the FIFO buffers 4. The FIFOs 4 issue flags indicating an overrun of the FIFO buffers 4. When a buffer overrun occurs for a FIFO buffer 4, the corresponding data are corrupted. The flag counter 9 counts 32 the single FIFO flags. As long as at most 'm' FIFO buffers 4 indicate an overrun, writing 31 continues until a synchronization point is determined 33. This is possible as the missing data can be reconstructed. When a synchronization point is determined 33, those storage units 2 to which corrupted data are written due to a buffer overrun, i.e. a maximum of 'm' storage units, are indicated 34 for a later rebuilding. In case more than 'm' FIFO buffers 4 run over, data is lost. The data are therefore marked 35 as corrupted. However, writing 36 to the storage unit continues until a synchronization point is determined 37. Once all data have been written to the storage units, the write access is finished 30. When executing a read access to these data, the indicated storage units 2 can not be considered and the read performance advantage is lost. In addition, the protection of the RAID architecture against data loss is not available for these data. As during a read access, when a synchronization point is determined 36, the FIFO flags are evaluated again. This procedure is repeated until all data are written. An example of a useful synchronization point is the beginning of a new write access. As during reading, in case the algorithm 8 requires n×8 words to calculate correct data, the next possible synchronization point is reached when eight words have been written to at least 'n' FIFOs 4.

Of course, corrupted data are usually not acceptable. However, by tolerating corrupted data the remaining data stream can still be used, as long as the application using the data stream is capable of handling corrupted data within a data stream, e.g. by splitting the data stream into two separate data streams at the location of the corrupted data.

To rebuild the RAID protection a read and write access to the mass storage system 1 is executed. This is schematically illustrated in FIG. 4. When the time critical write access has finished, e.g. when the storage system 1 is in an idle state 40, the μPC 10 issues 41 a rebuild command. In response the set flags of the write access are retrieved 42 and the written data are read 43 from the storage system 1. When all data of the write access are available, i.e. when all expected flags have been issued 44, the lost data or redundancy data are generated 45. The generated data is then written 46 to the storage units 2 that were not used during the time critical write access. This procedure is repeated until all data have been rebuilt 47.

The invention claimed is:

1. A method for reading data from a redundancy protected storage system with two or more storage units, each storage unit having an associated storage unit controller and an associated FIFO buffer, the method comprising the steps of:
   issuing a read request to the two or more storage units;
   determining the number of storage units having data available for reading in the associated FIFO buffer;
   reading the available data when at least a minimum number of storage units has data available for reading in the associated FIFO buffer;
   reconstructing missing data from the read data;
   defining one or more synchronization points within the data requested in the read request;
   discarding data up to a next synchronization point from the associated FIFO buffers of those storage units that do not have data available for reading in the associated FIFO buffer; and
   making available data starting from the next synchronization point in the associated FIFO buffers of those storage units for which data have been discarded from the associated FIFO buffers.

2. The method according to claim 1, further comprising the step of resetting the associated FIFO buffers of those storage units, that do not yet have data available for reading in the associated FIFO buffers, upon reading of the available data.

3. The method according to claim 1, wherein flags associated to the storage units indicate whether a storage unit has data available for reading in the associated FIFO buffer.

4. The method according to claim 1, wherein the storage units are harddisks, solid state memories or drives for optical or magnetic disks.

5. The method according to claim 1, wherein the storage system is a RAID system.

6. Mass storage system with two or more storage units, wherein it is adapted to perform a method according to claim 1 for reading data from two or more storage units.

* * * * *